United States Patent [19]
Sato et al.

[11] Patent Number: 5,822,082
[45] Date of Patent: Oct. 13, 1998

[54] IMAGE PROCESSING APPARATUS

[75] Inventors: Shunji Sato, Tokyo; Chikara Sato; Koji Doji, both of Yokohama, all of Japan

[73] Assignee: Canon Kabushiki Kaisha, Tokyo, Japan

[21] Appl. No.: 273,603

[22] Filed: Jul. 12, 1994

Related U.S. Application Data

[63] Continuation of Ser. No. 984,235, Dec. 1, 1992, abandoned, which is a continuation of Ser. No. 398,923, Aug. 28, 1989, abandoned.

[30] Foreign Application Priority Data

Aug. 30, 1988 [JP] Japan .................................. 63-217215

[51] Int. Cl.⁶ .......................................................... H04N 1/00
[52] U.S. Cl. .......................... 358/401; 358/444; 358/450; 358/452; 358/473; 382/284; 382/313
[58] Field of Search .................................... 358/443, 448, 358/452, 453, 456, 473, 401, 450, 474, 444; H04N 1/00

[56] References Cited

U.S. PATENT DOCUMENTS

| 4,251,153 | 2/1981 | Levine | 358/401 |
|---|---|---|---|
| 4,714,940 | 12/1987 | Inoue | 399/6 |
| 4,719,516 | 1/1988 | Nagashima | 358/448 |
| 4,823,193 | 4/1989 | Takahashi | 358/494 |
| 4,862,281 | 8/1989 | Sato et al. | 358/473 |
| 4,901,163 | 2/1990 | Tsujioka et al. | 358/473 |
| 4,905,047 | 2/1990 | Watanabe et al. | 358/448 |
| 4,989,042 | 1/1991 | Muramatsu et al. | 358/401 |
| 4,992,827 | 2/1991 | Koyabashi et al. | 355/202 |

Primary Examiner—Thomas L. Stoll
Attorney, Agent, or Firm—Fitzpatrick, Cella, Harper & Scinto

[57] ABSTRACT

An image processing apparatus includes a reader for reading an image to be added to an original image, an editor for performing a desired editing process for image data read with the reader, and a storage medium for storing therein the image data edited by the editor. The storage medium is detachably mounted on a copying machine for copying the original image. The image data edited by the editor may be directly transmitted to the copying machine so as to be combined with the image being copied.

12 Claims, 16 Drawing Sheets

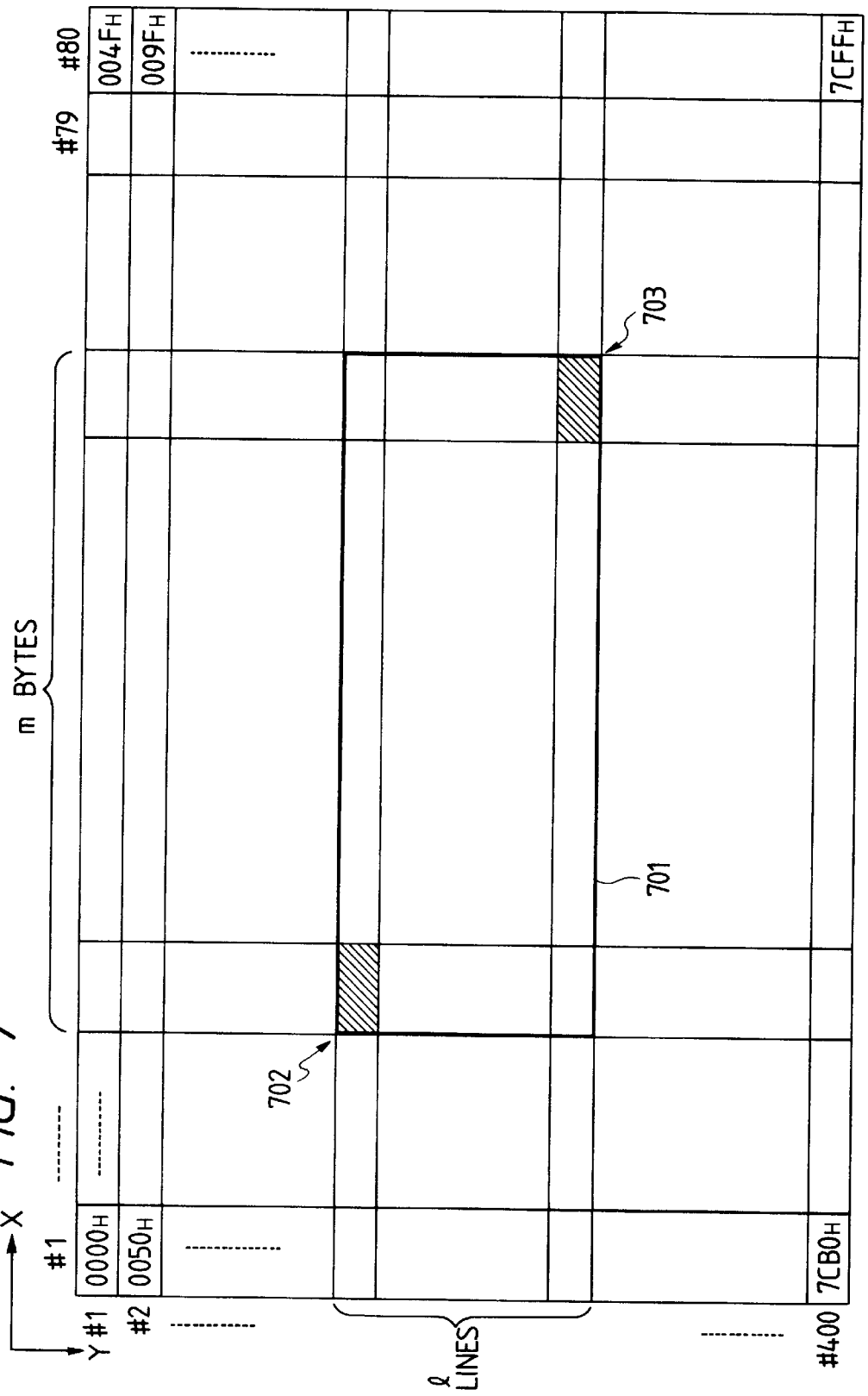

IMAGE PROCESSING APPARATUS

This application is a continuation of application Ser. No. 07/984,235 filed Dec. 1, 1992, now abandoned, which is a continuation of application Ser. No. 07/398,923, filed Aug. 28, 1989, also now abandoned.

BACKGROUND OF THE INVENTION

1. Field of the Invention

The present invention relates to an image processing apparatus for adding image information to an original image on a recording sheet.

2. Related Background Art

Information such as year/month/date, page number, circular or the like is usually required to be written on a copied sheet. To meet the requirement, there has been proposed by U.S. Ser. No. 302,085 a copying machine having a so-called add-on function to select a particular character such as "Year/Month/Data/", "Page", "Circular" or the like and print it together with an original image on a copy sheet.

Such a conventional copying machine has memory such as ROM into which a predetermined character information is previously stored. If a character other than those stored characters is required to be printed, it is necessary to replace the memory with a new one storing desired characters, or to add such a memory. This work is performed every time a new character is required to be printed.

If an image different from conventional font patterns such as a particular logo mark is required to be printed, it is necessary to form the logo mark with a dot pattern by using a computer or the like, and store it in a memory, thus necessitating extra work.

There are also some problems that even if an image to be added to an original image on a copy sheet is prepared for a certain copying machine, it cannot be used for a copying machine of other types, and that while an image to be added is formed by using a copying machine, this machine cannot be used for other purposes.

SUMMARY OF THE INVENTION

The present invention has been made in consideration of the above problems. It is an object of the present invention to provide an image processing apparatus capable of readily forming an image to be added to an original image.

It is another object of the present invention to provide an image processing apparatus wherein an image to be added to an original image is not stored in a storage medium in the copying machine, but in another detachable storage medium.

It is a further object of the present invention to provide an image processing apparatus wherein an image to be added to an original image can be formed not by the apparatus itself but by another apparatus.

BRIEF DESCRIPTION OF THE DRAWINGS

The above and other objects, advantages of this invention will become apparent from the following detailed description when read in conjunction with the accompanying drawings, in which:

FIG. 5 consists

FIG. 7 shows an address map of the data RAM;

DETAILED DESCRIPTION OF THE PREFERRED EMBODIMENT

A preferred embodiment of the image processing apparatus according to the present invention will be described with reference to the accompanying drawings. FIG. 1 shows the copying system embodying the present invention, wherein FIG. 1A shows the image synthesizer, and FIG. 1B shows the copying machine.

Figure 1A:
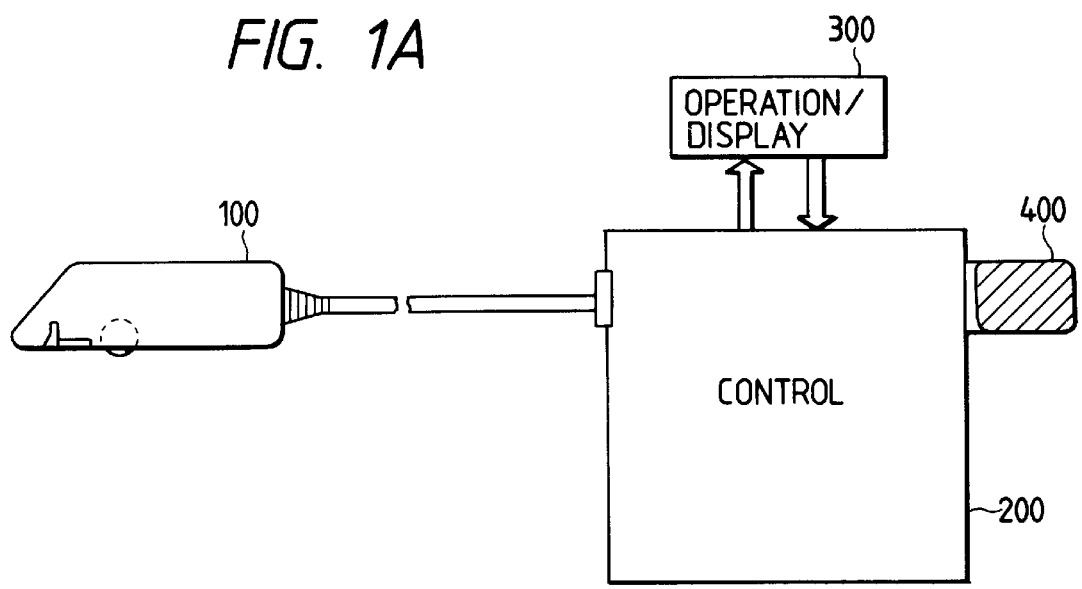
FIG. 1A is a schematic diagram showing an image synthesizer.

Referring to FIG. 1A, an image reader (hereinafter called image scanner) 100 is moved by an operator to read an image. The image scanner 100 reads the density information of an image with an image sensor such as CCDs and converts the read information into electric signals which are outputted as serial image data.

A controller 200 performs various control operations. For example, the controller 200 receives the image data sent from the image scanner 100 and displays the image on a display on an operation/display unit 300. The controller 200 edits image data in accordance with an edit command entered by keying an operation key on the operation/display unit 300. The controller 200 stores edited image data in a storage medium (memory card) 400.

Figure 1B:
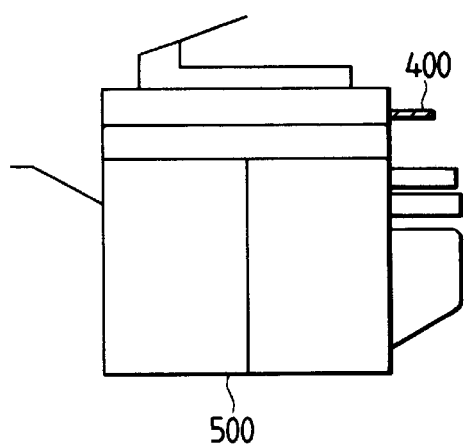
FIG. 1B is a schematic diagram showing a copying machine.

Referring to FIG. 1B, the copying machine 500 reads the edited data stored in a storage medium 400 and prints the edited data on a copy sheet.

Figure 2:
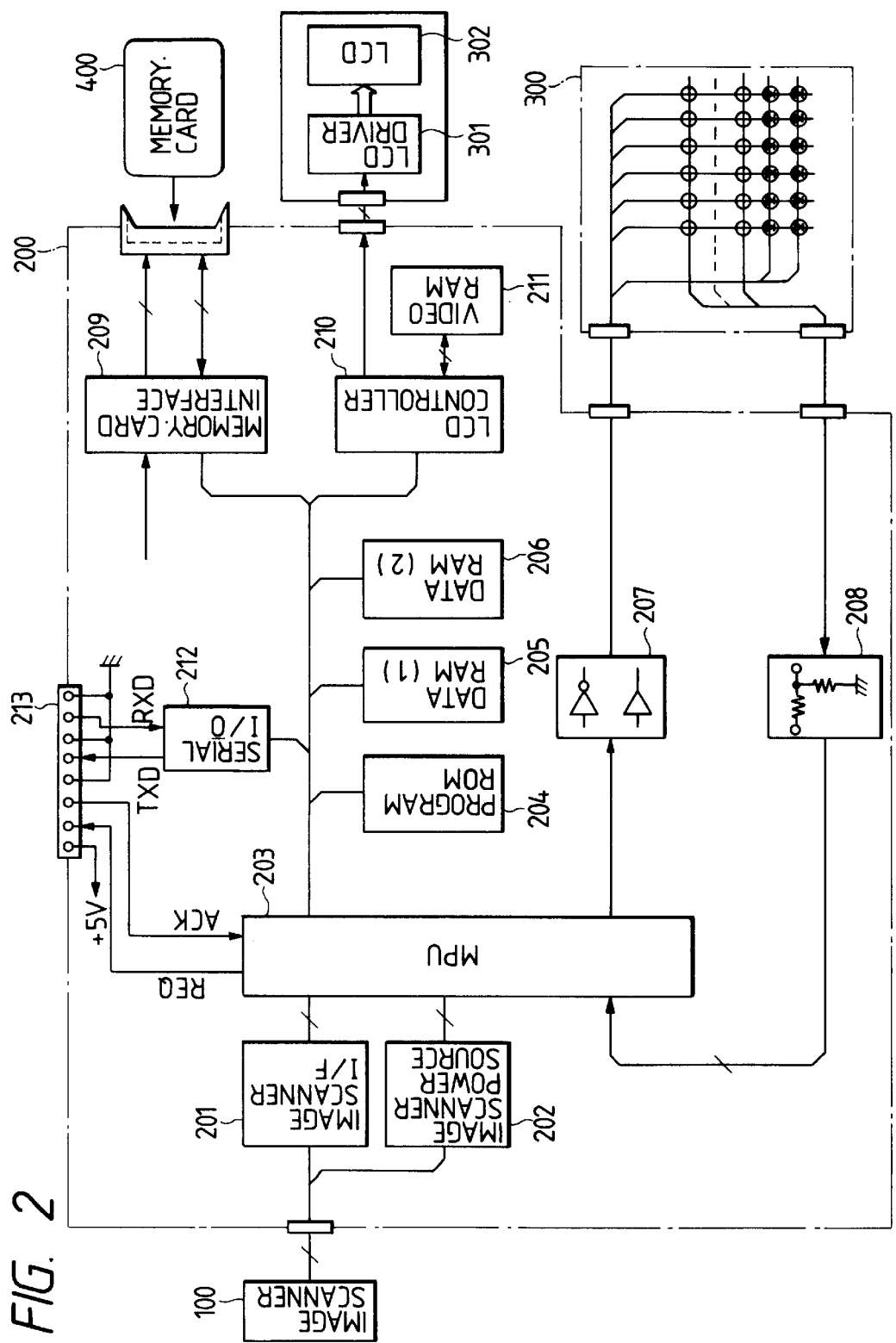
FIG. 2 is a block diagram of the image synthesizer.

FIG. 2 is a block diagram of the controller of the image synthesizer shown in FIG. 1A.

An MPU 203 performs control operations such as reading and editing the image data sent from the image scanner 100, and writing the image data into the memory card. A program ROM 204 stores therein the control programs for MPU 203. RAMs 205 and 206 store therein the image data read with the image scanner.

A display LCD 302, LCD controller 210, LCD driver 301 and video RAM 211 are used for visualizing the image data read with the image scanner 100 and stored in RAMs 205 and 206.

The operation/display unit 300 is used for entering an image input start command, edit operation command and the like. A scanner driver 207 is used for scanning the key matrix of the operation/display unit 300. A key scan input circuit 208 receives a command from the operation/display unit 300 and sends it to MPU 203.

The memory card 400 stores the edit image data. A memory card interface 209 is used for data transfer between the controller 200 and memory card 400.

An image scanner interface 201 is used for data transfer between the image scanner 100 and controller 200. Reference numeral 202 represents an image scanner power source.

A serial interface 212 is used for transmission/reception of image data and the like relative to external apparatus. A terminal 213 is connected to the signal lines from external apparatus.

Figure 3A:
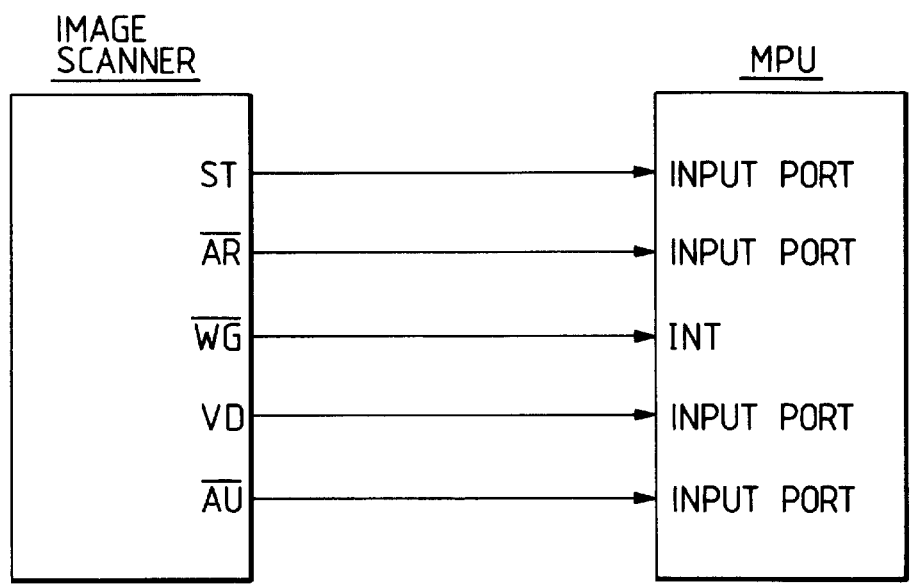
FIG. 3A illustrates signals transferred between the image scanner and the copying machine.
Figure 3B:
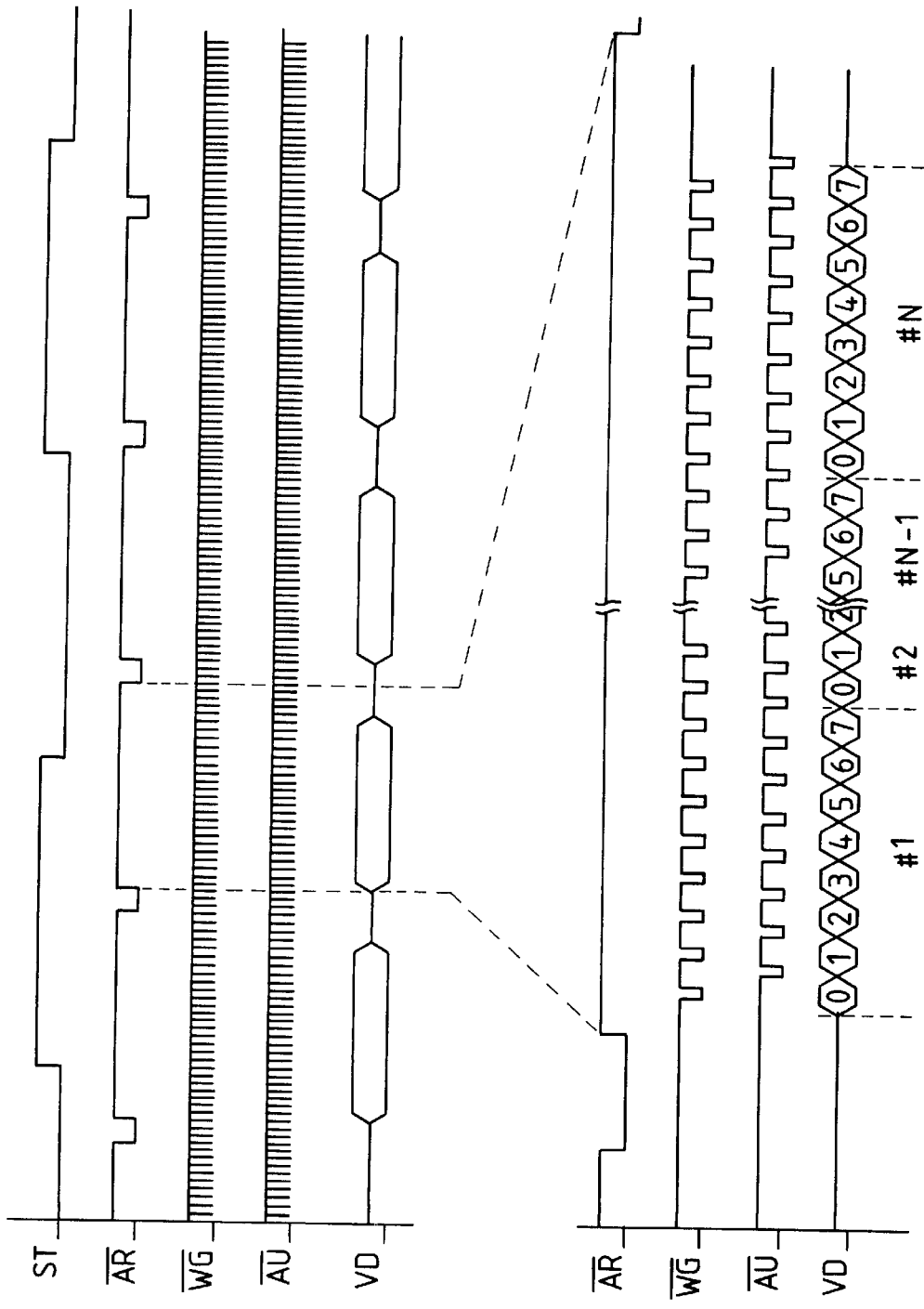
FIG. 3B is a timing chart of signals transferred between the image scanner and the copying machine.

FIG. 3A shows signals transferred between the image scanner 100 and MPU 203 via the image scanner IF 201, and FIG. 3B is a timing chart of the image scanner signals.

The image scanner signals are sent from the image scanner 100 to MPU 203 at the timings shown in FIG. 3B. The image scanner signals include: a line start signal (ST) which is generated each time the scanner roller rotates by 125 microns as the image scanner 100 is moved by the operator in the subscan direction; a main scan synchro signal (AR) representative of the top of the main scan; a latch signal (WG) indicating the data read timing; an address-up signal (AU) used for memory address increment; and a video signal (VD) representative of binarized image data.

Figure 4:
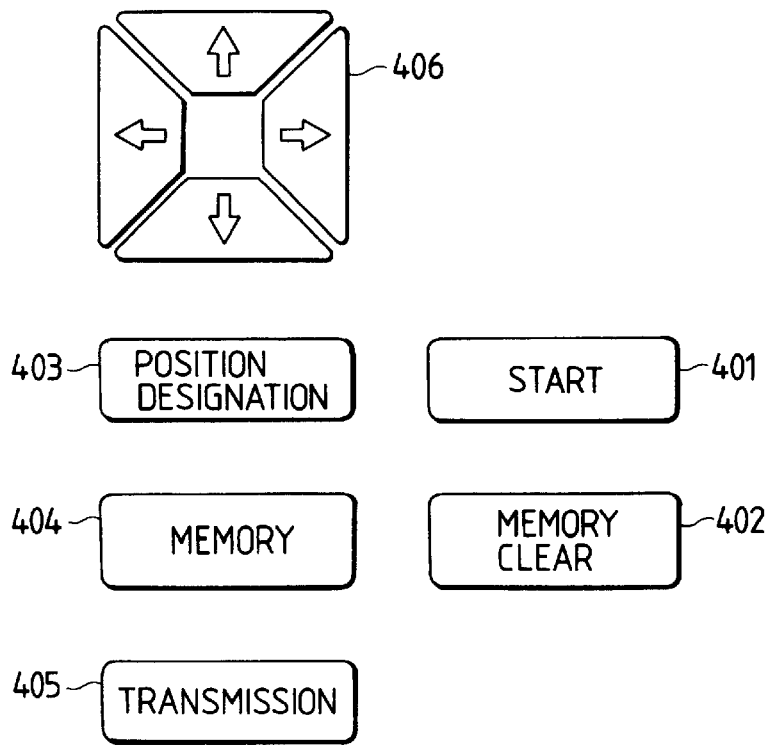
FIG. 4 is a schematic diagram showing a part of the operation console.

FIG. 4 shows a part of the operation/display unit 300. A start key 401 is used for entering a read start command for image data sent from the image scanner 100. A clear key 402 is used for entering a clear command for clearing the memory content. A position designation key 403 is used for designating an image position for an edit operation to be described later. A memory key 404 is used for entering a memory command for storing the contents of RAMs 205 and 206 into the memory card 400. A transmission key 405 is used for entering a command for transmitting the contents of RAMs 205 and 206 to external apparatus via the serial I/O 212. A motion key 406 is used for entering a command for moving the cursor on the display LCD 302.

Figure 5A:
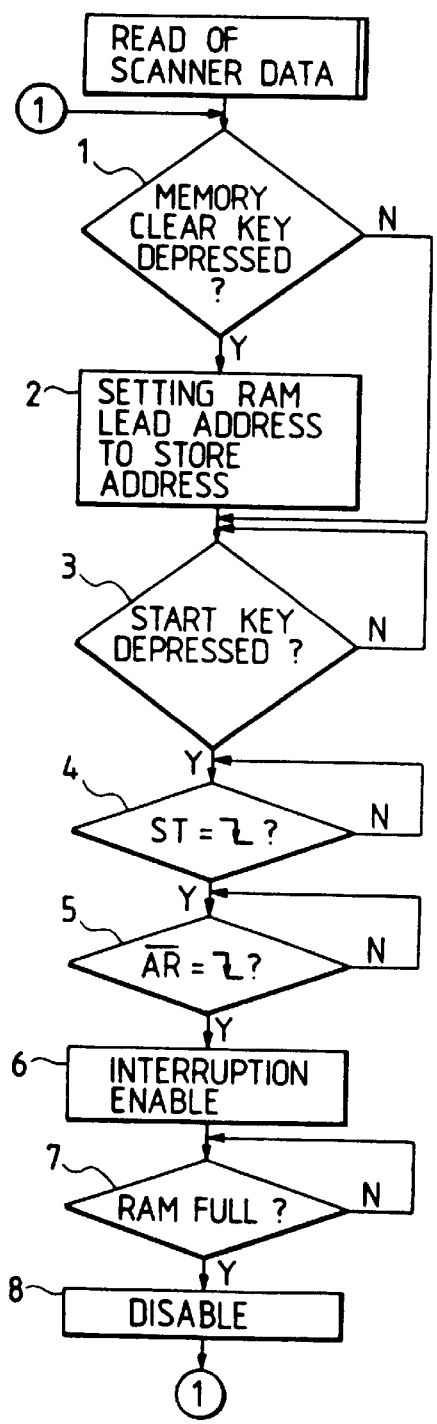
FIGS. 5(A) and 5(B), is a flow chart illustrating the procedure of reading scanner data.

FIG. 5 is a flow chart illustrating the operation by MPU 203 for reading scanner data.

It is checked if the memory clear key 402 on the operation unit is depressed (step 1). If depressed, a RAM lead address is set as the image storage RAM address (step 2). If a scanner read start key 401 is depressed (step 3), the read operation starts. Next, the input port of MPU is monitored to wait for a rising pulse of the ST signal (step 4).

Upon detection of the rising pulse of the ST signal, it is determined that the image scanner 100 is operated. Upon detection of a falling pulse of the AR signal immediately after the rising pulse of the ST signal (step 5), an interruption of the WG signal is permitted (step 6).

Figure 5B:
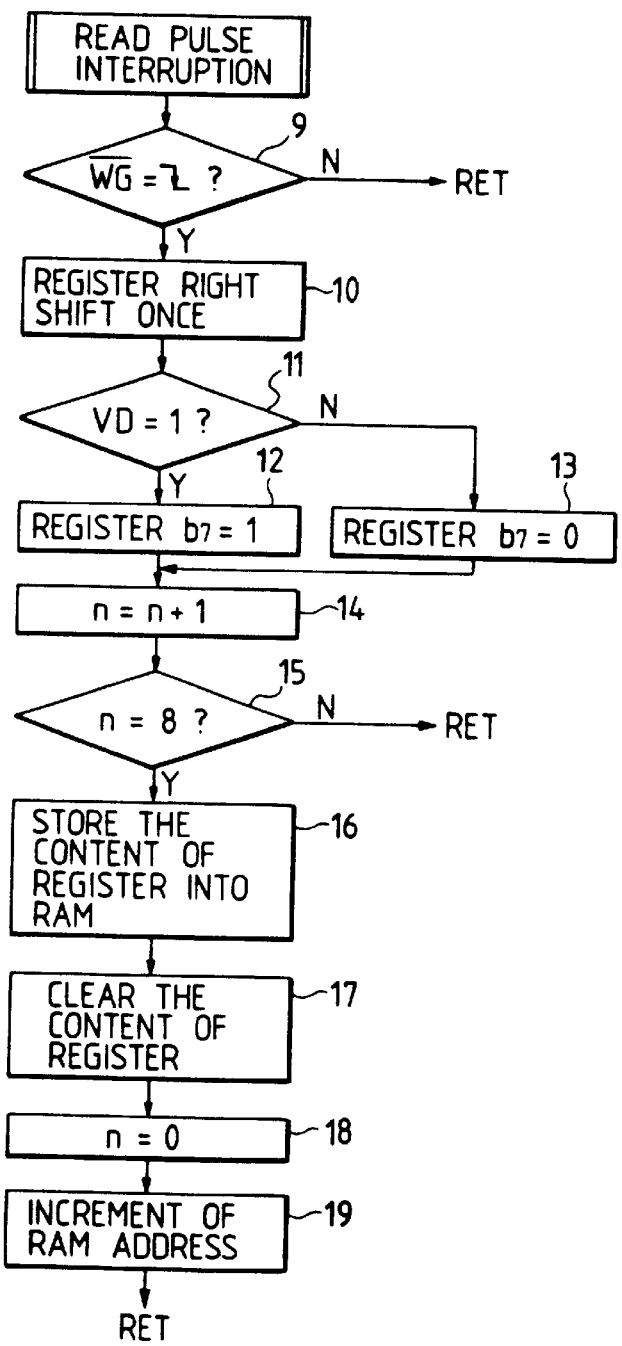

After permission of the WG signal interruption, each time the WG pulse is inputted (step 9), the read pulse interruption routine shown in FIG. 5B is executed. The contents of an 8 bit register in MPU 203 are shifted by one bit to the right (step 10). The input port of MPU to which the VD signal is inputted is checked (step 11). If VD=1, register b7 is set at 1, whereas if VD=0, register b7 is set at 0 (steps 12 and 13). The number n of interruptions is incremented by 1 (step 14).

The above operations are repeated until the number n becomes 8 (step 15). Then, the value of the register is written in the data RAMs 205 and 206 which store image information (step 16). The register is cleared (step 17), the number n is set at 0 (step 18), and the image information storage RAM address is incremented by 1 (step 19).

The above operations continue until the image information storage data RAMs 205 and 206 become full (step 7).

If the RAMs 205 and 206 become full, the WG signal interruption is inhibited (step 8) to terminate data fetching from the image scanner 100.

The image data written in the data RAMs 205 and 206 are displayed on the LCD 302 having 640 dots in the x-direction and 400 lines in the y-direction. Assuming that the resolution of the image scanner 100 is 8 dots/mm, the image displayed on the LCD 302 has a dimension of 80 mm×50 mm.

The capacity of the memory for such image information is about 80 bytes×400=32K bytes.

If a part of the image displayed on the LCD 302 is added to an original image, the image data for that part is derived from the data RAMs 205 and 206. In this case, the operator designates the area of the necessary image by using the position designation key 403 and four direction designation keys 406 on the operation/display unit.

The image data read with the image scanner 100 are stored in the data RAMs within the controller 300 as described previously. The image data are displayed on the LCD 302 on the operation/display unit as shown in FIG. 6(1) by way of example. A cursor 601 is displayed on the screen of the LCD 302. The cursor 601 can be moved up, down, right or left to a desired position by using the four cursor motion keys 406 on the operation/display unit. The cursor 601 is moved to the upper left corner of the area within which a desired image to be picked up is covered. Simultaneously therewith, the upper left corner position address for the data RAMs 205 and 206 are determined.

After determining the upper left corner position, another cursor 602 appears on the screen to determine a lower right corner position. The cursor 602 is moved to a desired position by using the four motion keys 406 in the similar manner as described above. At this time, also displayed on the LCD 302 is a rectangular designation line 603 with two diagonally opposite corners being indicated by the cursor 601 at the upper left corner and the cursor 602 at the lower right corner.

The cursor 602 is moved by the operator to the lower right corner of the area, and the position designation keys 403 are again depressed to designate that corner. Simultaneously therewith, the lower right corner position address of the data RAMs 205 and 206 storing the image data is determined.

FIG. 7 is an address map of the data RAMs 205 and 206, wherein there is shown a frame 701 corresponding to the desired image area designated by using the cursors on the LCD 302.

In the example shown in FIG. 7, the designated image area corresponds to the memory area with its corners designated at addresses 702 and 703, the area having a capacity of 1 lines×m bytes.

The number 1 of image information lines corresponds to the number of lines the cursor 602 passes in the y-direction after the cursor 601 determined the upper left corner position. The number m of image information bytes in the x-direction corresponds to the number of bytes the cursor 602 passes in the x-direction after the cursor 601 determined the upper left corner position.

Figure 8A:
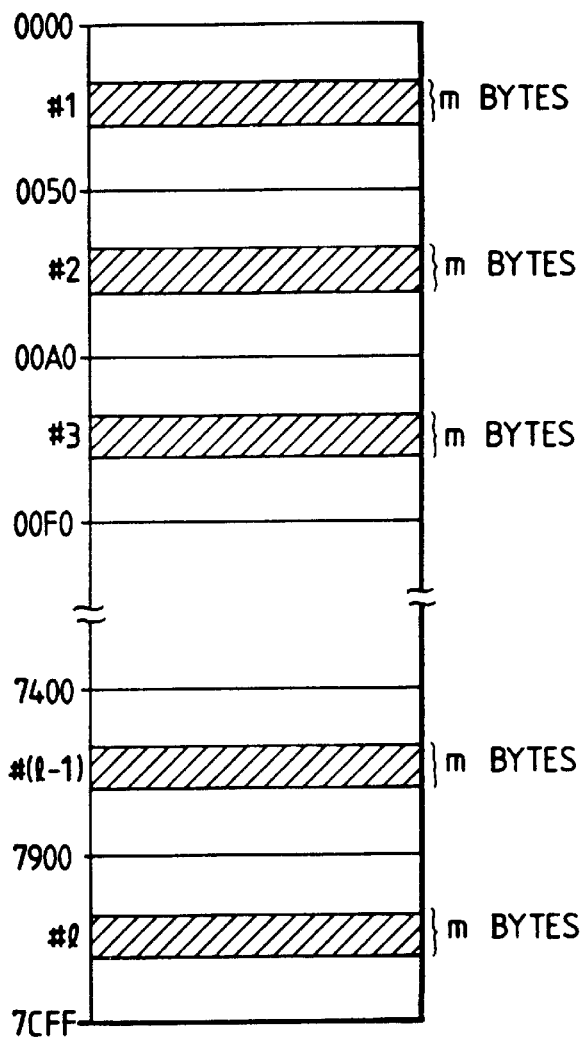
FIG. 8 consists of FIGS. 8(A) and 8(B), shows address maps of the data RAM and memory card.
Figure 8B:
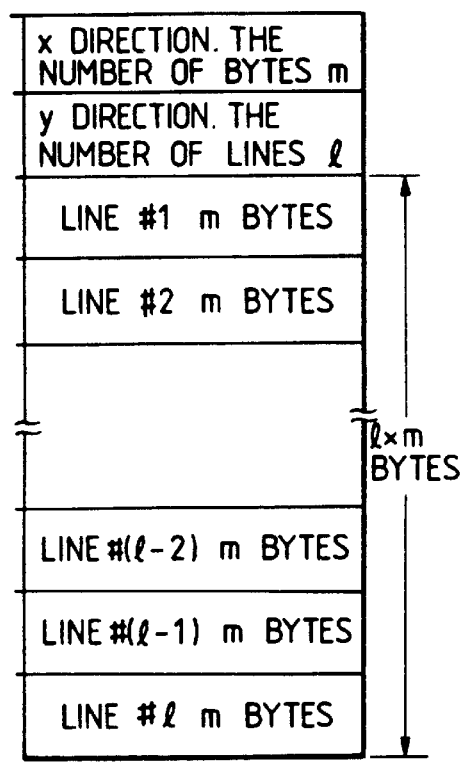

The image data in the memory area are picked up from the data RAMs 205 and 206 and written in the memory card in the following manner. FIG. 8 shows memory maps of the data RAMs 205 and 206, and the memory card 400.

Upon depression of the memory key 404, in order to define the dimension of the image to be picked up, MPU 203 writes the number m of bytes in the x-direction and the number 1 of lines in the y-direction, respectively in the area at two lead addresses of the memory card 400. The image data of m bytes are read from the data RAMs 205 and 206 at the next address and written in the memory card 400. After writing the image data of one line, a one line offset (80 bytes) is added to the current read start address after reading the image data of one line. The resultant address is used as a start address for the second line from which the image data m bytes are read and written in the memory card 400.

After repeating the above read operations for 1 lines, the image data to be picked up are completely written in the memory card 400.

The memory card 400 storing the desired image data is mounted on the copying machine interface unit. The copying machine then reads the image data and writes the image data directly on the photosensitive member by using a laser beam while performing an ordinary copying operation. As a result, arbitrary add-on information desired by the operator can be added to the original image.

It is apparent that the above-described image pick-up operation is not necessary if the whole image read with the image scanner 100 is added to an original image.

The size or direction of the read image from the data RAMs 205 and 206 can be changed by thinning, increasing, or address translating the read image data.

Figure 9:
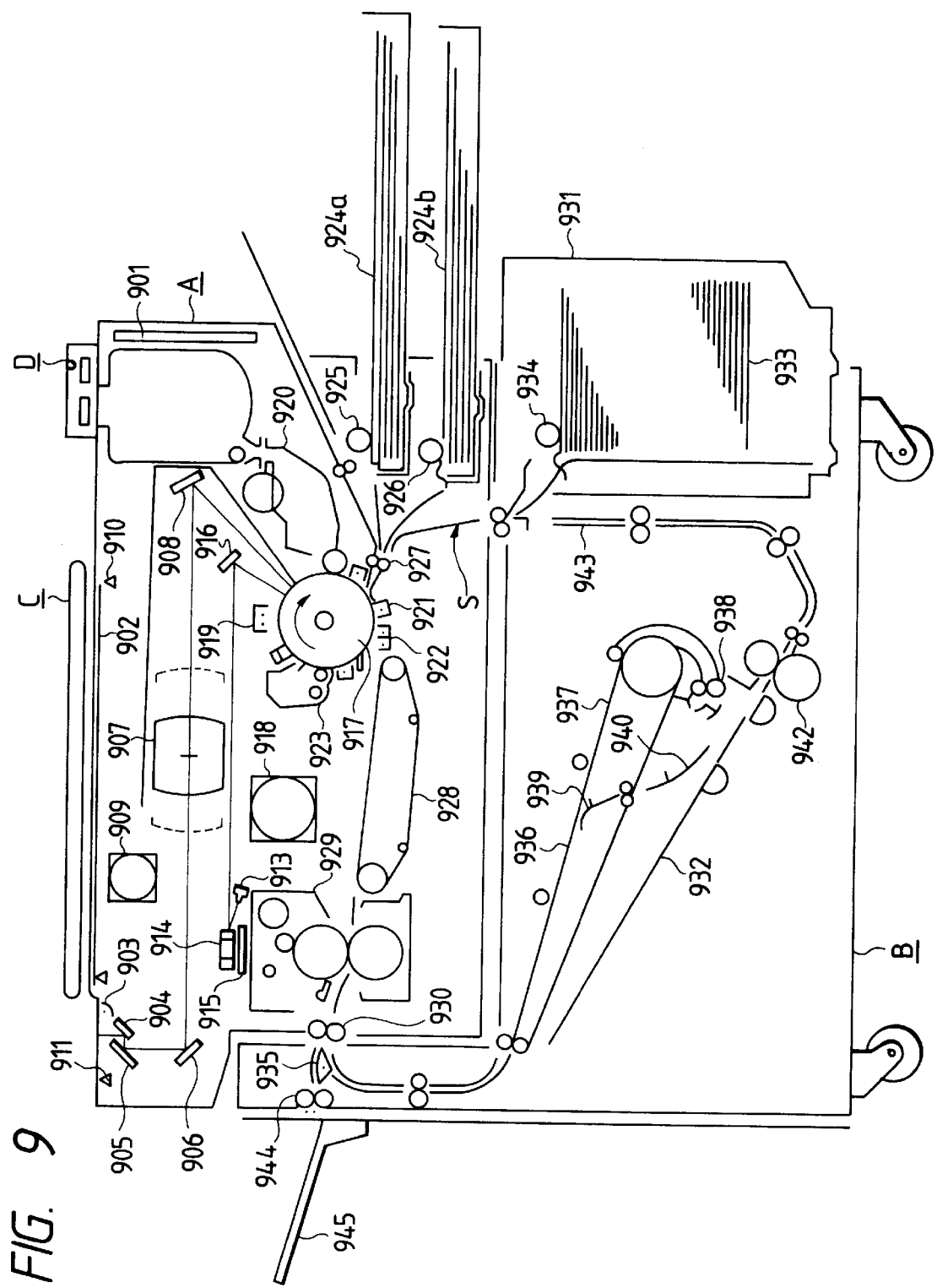
FIG. 9 shows the structure of the copying machine.

FIG. 9 is a cross section of the copying machine shown in FIG. 1B. The copying machine is constructed mainly of a main body unit A, pedestal unit B, editor unit C, IC card unit D and the like. The units B to D are arranged to be selectively mounted on the main body unit A.

In the main body unit A, a system controller (sequence controller) 901 controls the units A to D and are constructed of a CPU, ROM, RAM, interface, and the like.

An original is placed upon an original support glass 902. An illumination lamp (exposure lamp) 903 applies light to an original placed on the original support glass 902. Scan reflection mirrors (scan mirrors) 904 to 906 change the paths of light applied to an original from the illumination lamp 903 and reflected from the original. The illumination lamp 903 and reflection mirror 904 constitute a scan unit which moves in synchro with scanning an original.

A lens 907 regulates the optical path length and focus of reflected light scanned by the scan mirror 906. The lens 907 is located within the range indicated by dotted lines in FIG. 9 at the position corresponding to a magnification factor designated from the operation unit as will be described later.

A reflection mirror (scan mirror) 908 reflects the light reflected from an original, through the lens 907 onto a photosensitive member 917. An optical system motor 909 changes the speed of the scan unit in accordance with a magnification factor and drives the scan unit at a constant speed corresponding to that magnification factor. Sensors 910 and 911 detect the motion condition of the scan unit. A semiconductor laser 913 is modulated on and off by the image data. The laser beam is deflected with a polygon mirror 914 driven by a scanner motor 915 at a constant speed to thus form an image on the photosensitive member 917 by means of a reflection mirror (scan mirror) 916. The elements 913 to 916 constitute the laser unit.

A main motor 918 causes the photosensitive member 917 to rotate at a constant speed in the direction indicated by an arrow. A high voltage unit 919 charges the photosensitive member 917 to a latent image forming level. A developing unit 920 develops an original image and fixed format image formed on the photosensitive member 917 by using developing material (toner) supplied from a toner hopper.

A transfer charger 921 transfers a toner image developed on the photosensitive member 917 onto a recording sheet. A separation charger 922 separates a recording sheet from the photosensitive member 917, after the transfer process. A cleaner unit 923 recovers toner left on the photosensitive member 917.

An upper cassette 924a is used for supplying a recording sheet to the main body unit A by means of a paper feed roller 925. A lower cassette 924b is used for supplying a recording sheet to the main body unit A by means of another paper feed roller 926. A registration roller 927 aligns the top of an image formed on the photosensitive member 917 with the top of a recording sheet, and feeds the recording sheet stopped at a predetermined timing to a transfer position. A conveyor belt 928 conveys a recording sheet after the transfer process to a fixing unit 929 which fixes toner on the recording sheet by means of pressurized heating.

The operation of the main body unit A will be described.

The surface of the photosensitive member 917 is formed with a seamless photosensitive member made of a photoconductive layer and an electric conductive body. The photosensitive member 917 is rotatively supported and starts rotating at a constant speed in the direction indicated by the arrow in FIG. 9 when the main motor 918 operates in response to a depression of a copy start key in the manner to be described later. Next, after completion of the predetermined rotation control and potential control process (pre-process) for the photosensitive member 917, an original placed on the original support glass 902 is illuminated by means of the illumination lamp 903 of the scan unit integrally constructed of the scan mirror 904. The reflected light from the original passes through the scan mirrors 904 to 906 and scan mirror 908, and is focussed onto the photosensitive member 917. The photosensitive member 917 is corona charged by means of the high voltage unit 919, and thereafter the original image illuminated with the illumination lamp 903 is slit-exposed to thereby form a latent image on the photosensitive member 917.

The latent image on the photosensitive member 917 is then developed with the developing roller of the developing unit 920 to visualize it as a toner image. The toner image is transferred onto a recording sheet with the transfer charger 921. Specifically, a transfer sheet on the upper cassette 924a or lower cassette 924b is supplied to the main body unit by means of the paper feed roller 925 or 926. The transfer sheet is conveyed to the photosensitive roller at a correct timing by the registration roller 927 to thereby align the tops of the latent image and recording sheet. The recording sheet thereafter passes between the transfer charger 921 and the photosensitive member 917 so that the toner image on the photosensitive member 917 is transferred onto the recording sheet. After this transfer process, the recording sheet is peeled off from the photosensitive member 917 by means of the separation charger 922 and guided to the fixing unit 929 by means of the conveyor belt 928. Lastly, the recording sheet is ejected out of the main body unit A by means of the discharge roller 944.

While the photosensitive member 917 continues to rotate, the toner left on the surface thereof is removed by the cleaner 923 constructed of a cleaning roller and flexible blade, to thus make clean the surface of the photosensitive member 917.

In the pedestal unit B, a paper deck 931 accommodates recording sheets, for example, about 2000 sheets. An intermediate tray 932 is used for both-side copy and multiple copy. In the case of both-side copy, a recording sheet is temporarily placed on the tray with its side, on which an image has been recorded, being directed upward, whereas in the case of multiple copy, a recording sheet is placed on the tray with its side, on which an image or images have been recorded, being directed downward. A lifter 933 lifts up the paper deck 931 so as to make the uppermost recording sheet in the deck contact a paper feed roller 934.

A discharge flapper (direction flapper) 935 selects either a paper feed passage or a paper discharge passage for the recording sheet fed by a paper feed roller 930. The recording sheet passed through the paper feed passage is guided onto passages 936 and 937. An intermediate tray weight 938 causes the recording sheet passed through the discharge flapper 935 and passages 936 and 937 to move backward, to thereby accommodate the sheet within the intermediate tray 932.

A multi-flapper 939 mounted between the passages 936 and 937 changes a passage depending upon the both-side copy and multiple copy. When the multi flapper 939 moves upward, the transfer sheet is guided to a multiple copy passage 940. A multi-discharge sensor 941 detects the end of a recording sheet passed through the multi-discharge flapper 939. A paper feed roller 942 feeds a recording sheet to the photosensitive member 917 side via a passage 943. A discharge roller 944 discharges a recording sheet after image formation, out of the pedestal unit B. A discharge tray 945 stacks thereon recording sheets after image formation.

The operation of the pedestal unit B will be described.

In the case of the both-side recording or multiple recording (both-side copy or multiple copy), the discharge flapper 935 of the pedestal unit B is moved upward to thereby guide a recording sheet after image formation to the passages 936 and 937 and to the intermediate tray 932. In the case of both-side copy, the multi-flapper 939 is moved downward, and in the case of multiple copy, it is moved upward. The intermediate tray 932 can accommodate recording sheets, for example, up to 99 sheets. The recording sheets accommodated within the intermediate tray 932 are pushed down with the intermediate tray weight 938.

For the both-side copy or multiple copy, the recording sheets within the intermediate tray 932 are guided one by one starting from the bottom by means of the intermediate weight 938, through a passage 938 to the registration roller 927 of the main body unit A.

The editor unit C will be described with reference to FIG. 10 which is a plan view showing the structure of the editor unit C shown in FIG. 9.

Figure 10:
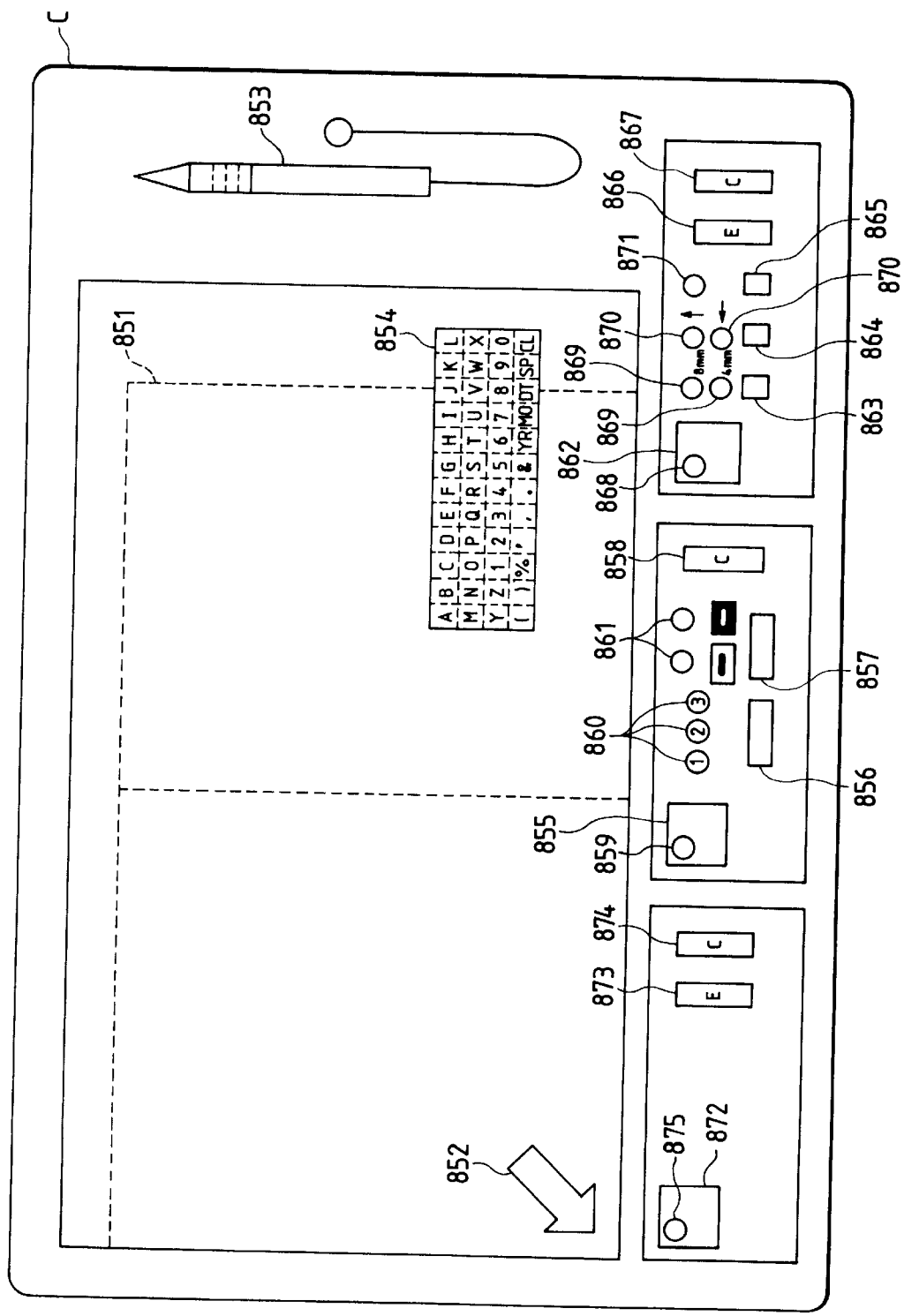
FIG. 10 is a plan view of the editor unit.

Referring to FIG. 10, a digitizer unit 851 is used for area designation, character add-on, and hand-written input. An original is set on the digitizer unit 851 to perform coordinate input. A reference mark 852 indicates the position at which the corner of an original is aligned. A stylus pen 853 is used to press the digitizer unit 851 and input coordinate information for the area designation, character add-on, or handwritten input. An input information area 854 displays thereon alphabets, numerals, symbols, data information (year (YR), month (MO), day (DT)) and the like, which are entered upon designation by the stylus pen 853. An area mode designation key 855 is used for entering an area designation mode. A memory key 856 is used for entering an instruction to store the area defined by two diagonally opposite points designated with the stylus pen 853. A mode key 857 designates either trimming or masking the area designated with the stylus pen 853. A clear key 858 is used for releasing the area designation and clearing the area information stored in an internal memory. An area designation mode display 859 is illuminated when the area mode designation key 855 is depressed to notify an operator of the area designation mode. Area storage number displays 860 are sequentially illuminated each time the stylus pen 853 is used and the memory key 856 is depressed. For example, if area information is stored three times, all the displays 860 are illuminated. Mode displays 861 are cyclically illuminated to indicate a masking mode or trimming mode each time the mode key 857 is depressed.

An add-on mode key 862 is used when a character is added to an image, to thereby notify the add-on mode. A font size key 863 is used for entering the size of a character to be added, for example, 4 mm square or 8 mm square size. A direction designation key 864 is used for entering the direction of the character if it is parallel to or perpendicular to the paper feed direction. An add-on character position designation key is used for entering the character add-on start position. An enter key 866 is used for entering the end of adding character to an image.

A character clear key 867 is used for clearing inputted character information. A character input display 868 is illuminated upon depression to notify an operator of a character input mode. Font size displays 869 are alternately illuminated upon depression of the font size key 863 to notice the displays 870 are alternately illuminated upon depression of the direction designation key 864 to notice the selected add-on character direction.

A position input end display 871 is illuminated upon depression of the enter key 866 to notice the position input end. When a hand-written input mode key 872 is depressed, a display 875 is illuminated to notice the hand-written input mode. A hand-written mode clear key 874 is used for clearing the hand-written input mode.

The structure of the IC card unit D shown in FIG. 1 will be described with reference to FIGS. 11*a* and 11*b* which are a perspective view and cross section of the IC card unit D.

Figure 11A:
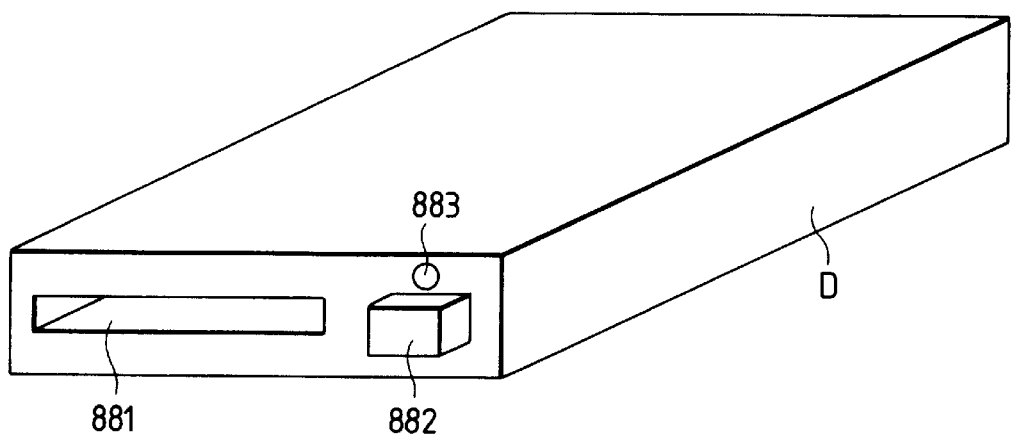
FIG. 11A and 11B show the structures of the IC card unit.
Figure 11B:
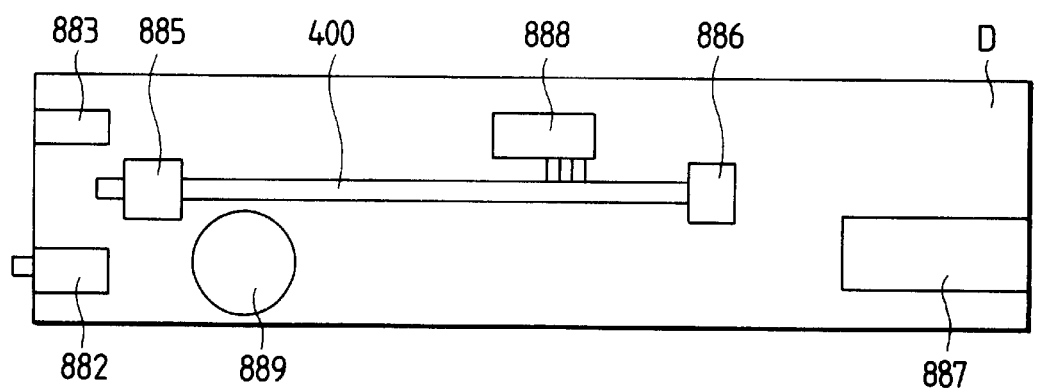

Referring to FIGS. 11*a* and 11*b*, a memory card 400 is inserted into a card inlet 881. The memory card 400 includes semiconductor integrated circuits (CPU, RAM, ROM) fabricated on a base such as a plastics card. An image or images to be added to an original image are read with the image scanner and stored in the memory card (external storage means) 400.

A card eject button 882 is used to eject the memory card 400 inserted into the IC card unit. A display 883 is illuminated when the memory card 400 is inserted, and turned off when it is ejected out. A card position sensor 885 detects an insertion of the memory card 400, and a card position sensor 886 detects the completion of inserting the memory card to notice the completion. A connector 887 is used for connection to the main body unit A. A contact 888 contacts the port of the memory card 400. A transport motor 889 rotates in the ordinary direction when an insertion of the memory card 400 is detected with the card position sensor 885, to thereby load the memory card 400 within the unit, and stops when the card position sensor 886 detects the completion of inserting the memory card 400. Upon depression of the card eject button 882, the transport motor 889 rotates in the backward direction to eject out the memory card 400, and stops when the card position sensor 885 no longer detects the memory card 400.

Next, the operation of the main body unit shown in FIG. 9 will be described with reference to FIG. 12 which is a plan view of the operation unit.

Figure 12:
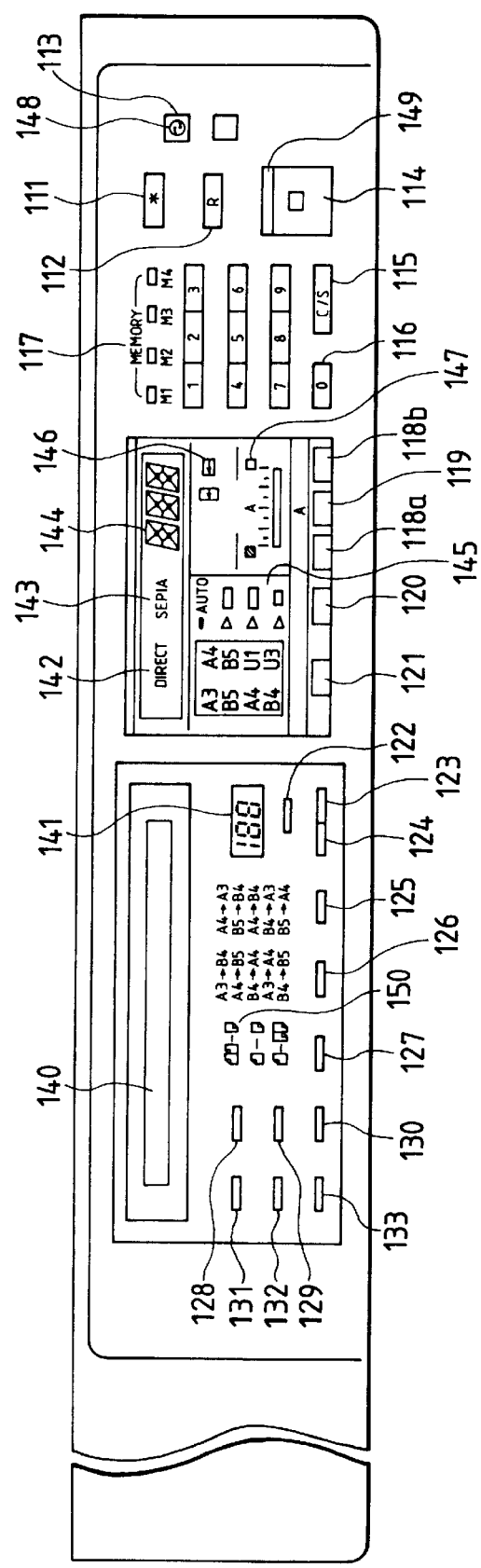
FIG. 12 shows the operation console.

Referring to FIG. 12, an asterisk key 111 is used for an operator to enter a setting mode such as a paper binding margin setting mode, an original frame erase size setting mode, and the like. An all-reset key 112 is used for forcibly changing from a presently set mode to a standard mode (equal magnification, automatic density, automatic paper feed, one sheet copy). A pre-heat key 113 is used for setting the print engine of the main body unit A at a pre-heat state, and for releasing the pre-heat state. The pre-heat key 113 is also depressed when the auto shut-off mode is returned to the standard mode.

A copy start key 114 is used for starting a copy operation. A clear/stop key 115 operates as a clear key during stand-by state, and as a copy stop key during a copy operation. The clear/stop key 115 is also depressed for releasing the set number of copy sheets, and for intercepting the copying operations for plural sheets.

A ten key 116 is used for entering the number of copy sheets, and also for setting the asterisk mode. A memory key 117 is used for registering a mode which an operator frequently uses. Copy density keys 118a and 118b are used for manually adjusting the copy density. An automatic density setting key (AE key) 119 is used for automatically setting the copy density, and for releasing the automatic density adjustment and switching to the manual density adjustment.

A cassette selection key 120 is used for selecting one of the upper cassette 924a, lower cassette 924b and paper deck 931. Upon depression of this cassette selection key 120 while an original is placed on the editor unit C, an automatic cassette selection (APS) is set to thereby automatically select the cassette accommodating sheets corresponding to the original size.

An equal magnification key 121 is used for performing a copy operation at equal magnification. An auto variable magnification key 122 is used for automatically reducing or magnifying the original image in accordance with the designated transfer sheet size. Zoom keys 123 and 124 are used for designating a desired magnification factor from 64 to 142%. A fixed variable magnification key 126 is used for reducing or magnifying the fixed size original image. A both-size copy key 127 is used for copying a one-side original onto a both-side copy sheet, a both-side original onto a both-side copy sheet, or a both side original onto a one-side copy sheet. A binding margin key 128 is used when a binding margin of a designated length is formed at the left side of a recording sheet. A photograph key 129 is used for copying a photograph original. A multiple key 130 is used for combining two original images onto the same side of a recording sheet.

An original frame erase key 131 is used for erasing the fixed size original frame. In this case, the original size is set by using the asterisk key 111. A sheet frame erase key 132 is used for erasing the frame of an original in accordance with the cassette size. A multi-page key 133 is used for copying the right and left page of an original document separately into two recording sheets.

An LCD type message display 140 displays a message of 40 characters each constructed of 5×7 dots. This display 140 is made of semi-transparent type liquid crystal and uses back light of two colors. A green color back light is turned on in an ordinary case, whereas an orange color back light is turned on in an abnormal state or in a copy disabled state. A magnification factor display 141 displays a magnification factor in percent representation set by the zoom keys 123 and 124. An equal magnification display 142 is illuminated when the equal magnification factor is set.

A color developing display 143 is illuminated when a sepia developing unit is mounted on the main body unit. A copy number display 144 displays the number of copy sheets, or a self-diagnosis code. A cassette display 145 displays which one of the upper cassette 924a, lower cassette 942b and paper deck 931 has been selected.

An original direction display 146 displays the set direction (vertical or lateral) of an original. An AE display 147 is illuminated when the automatic density adjustment (AE) is selected by the AE key 119. A pre-heat display 148 is illuminated during the pre-heat state. The pre-heat display 148 is turned off during the auto shut-off state. A ready/wait display 149 has green and orange LEDs. The green LED is illuminated during the ready state (copy enabled), and the orange LED is illuminated during the wait state (copy disabled). A both-side copy display 150 is illuminated when a copy operation from a both-side original to a both-side copy sheet, or from a one-side original to a both-side copy sheet.

The conditions set at the standard mode are one sheet copy, density AE mode, auto paper selection, equal magnification, and a copy operation from a one-side original to a one-side copy sheet.

Figure 13:
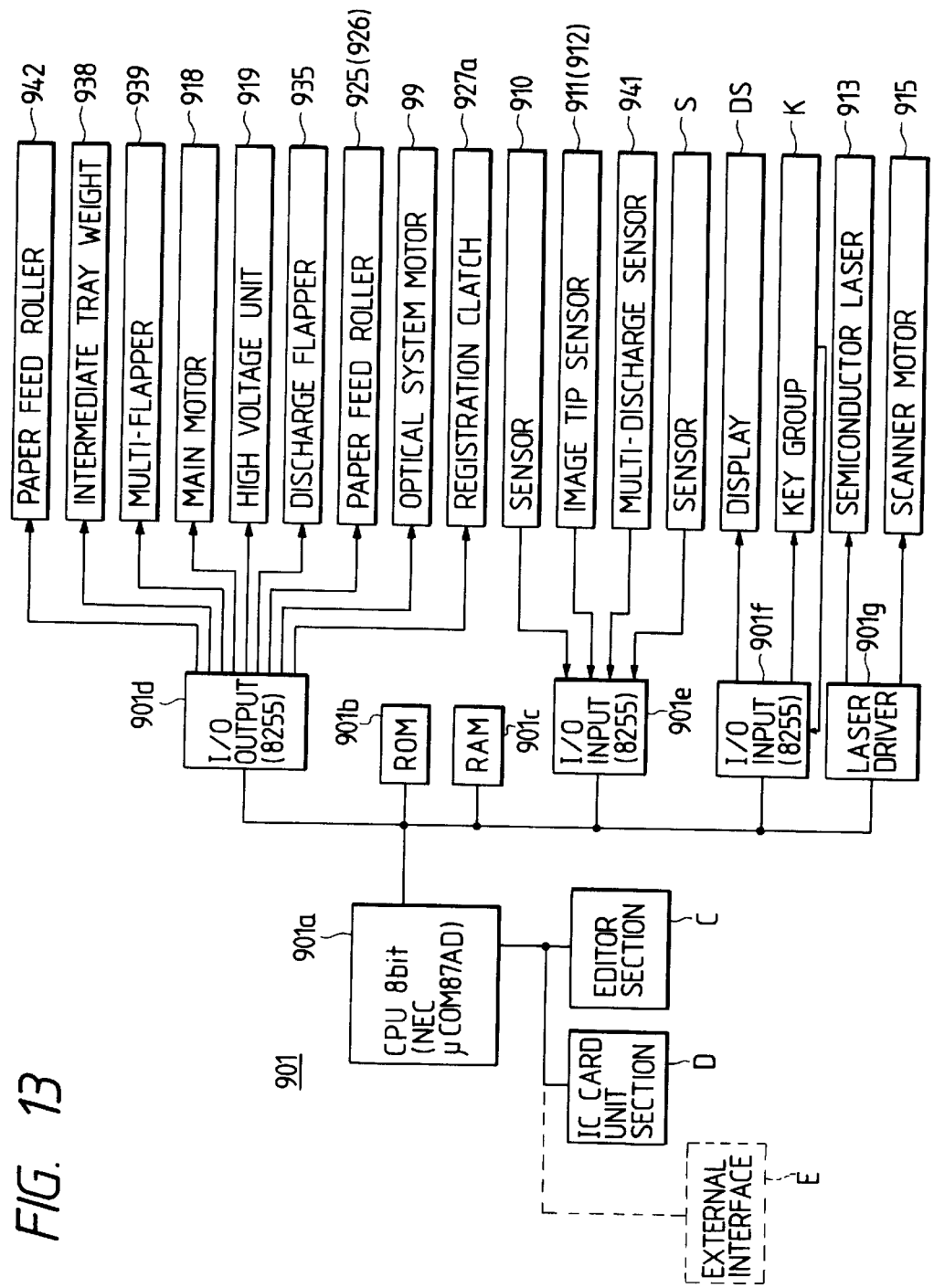
FIG. 13 is a block diagram showing the system controller.

Next, the structure of the system controller 901 shown in FIG. 9 will be described with reference to FIG. 13 showing a block diagram of the system controller 901. Similar elements to those shown in FIGS. 9 to 12 are designated by using identical reference numerals.

Referring to FIG. 13, a CPU 901a controls the whole part of the image processing system in accordance with the control programs stored in a ROM 901a, A RAM 901c serving as a main storage unit stores input data, and functions as a working area for the input data. An output interface circuit 901d outputs control signals instructed by CPU 901a to the load such as the main motor 918. An input interface circuit 901e sends an input signal detected with the image tip sensor 912 or the like to CPU 901a. An interface circuit 901f controls the input/output of the display group DS and key group K of the operation unit shown in FIG. 12. The display group DS includes the displays constructed of LEDs or LCDs shown in FIG. 12. The key group K includes the keys shown in FIG. 12, the depression of each key being judged by CPU 901a using a known key matrix scan.

A laser driver 901g outputs a drive signal for driving the semiconductor laser 913 and scanner motor 915 in accordance with the drive control signal from CPU 901a. A register clutch 927a drives the registration roller 927 shown in FIG. 9. Reference character S represents a pedestal sensor corresponding to a sensor in the pedestal unit B.

E represents an external interface provided, if necessary, for receiving image data from the control unit 200 shown in FIG. 1 through serial communication, as will be described later.

The operation of image writing by using the laser unit will be described with reference to FIG. 14 which is a perspective view for explaining the operation of the semiconductor laser 913 shown in FIG. 9. Similar elements to those shown in FIGS. 9 and 13 are represented by using identical reference numerals.

Figure 14:
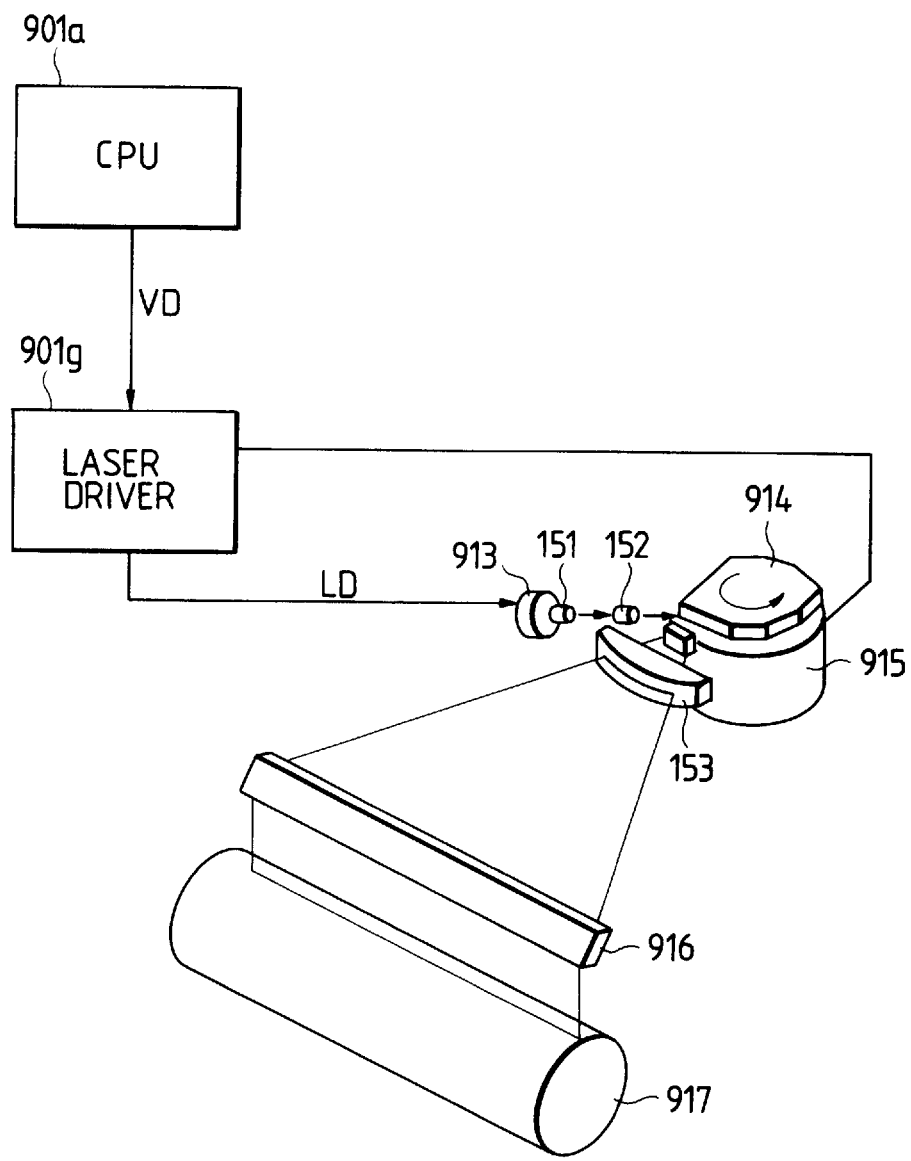
FIG. 14 illustrates a laser driver system.

Referring to FIG. 14, a collimator lens 151 converts the laser beam radiated from the semiconductor laser 913 into parallel light. A cylindrical lens 152 adjusts the optical axis of the laser beam from the collimator lens 151 so as to make it parallel to the shaft of the photosensitive member 917. A focussing lens 153 adjusts the scan speed of the laser beam deflected by the polygon mirror 914 so as to make it constant.

The image data stored in an memory area of the memory card 400 inserted into the IC card unit D are fetched into RAM 901c under control of CPU 901a. The video signal VD corresponding to the image data is outputted to the laser driver 901g which in turn outputs a laser drive signal LD to the semiconductor laser 913. A laser beam modulated on and off by the laser drive signal is generated from the semiconductor laser 913. The generated laser beam is made parallel by means of the collimator lens 151, and made parallel to the drum shaft on the scan mirror 916 by means of the scan mirror 916. The laser beam deflected by the polygon mirror 914 rotating at a constant speed is applied to the photosensitive member 917 via the focussing lens 153 to thereby form an electrostatic latent image.

As described above, a desired electrostatic latent image can be formed finely, e.g., 4 pel (8 dots/mm) in this embodiment, on the photosensitive member 917 at an optional position under control of the video signal VD outputted from CPU 901a. Such an image stored in RAM 901c can be reproduced finely on a recording sheet when necessary.

Next, the operation of reading image data from the memory card 400 will be described.

Stored in the memory card 400 are image data read with the image scanner 100 and, if necessary, edited by the control unit 200. Upon insertion of the memory card 400 into the inlet 881 of the memory card unit D, the image data for each scan line are read via the contact 888 and developed in RAM 901c of the sequence controller 901.

Figure 15:
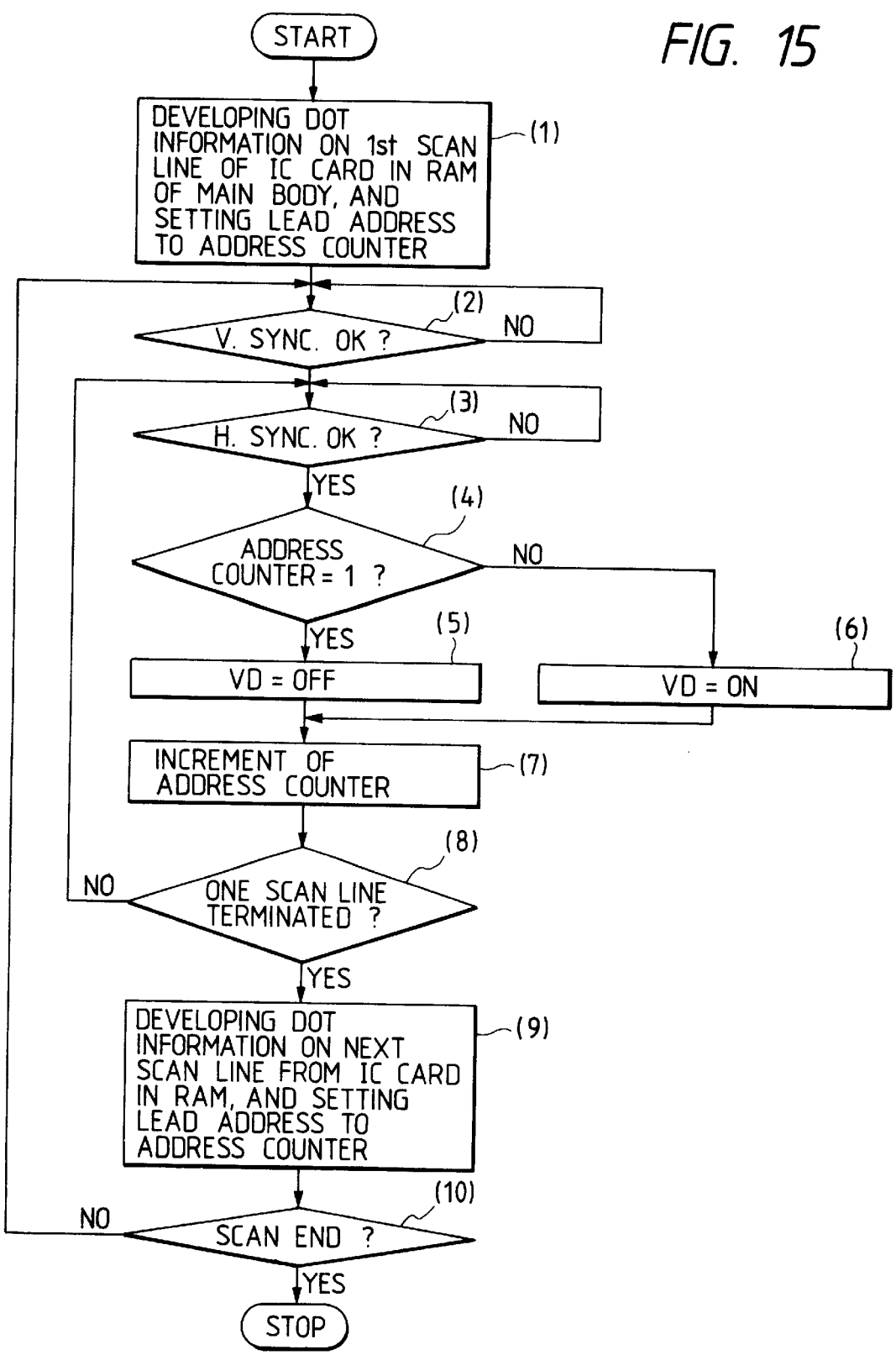
FIG. 15 is a timing chart illustrating the procedure of image forming operation.

The operation of forming and processing an image will be described with reference to FIG. 15 which shows a flow chart illustrating the operation and including steps 1 to 10.

Dot information on the first scan line is read from the memory card 400 and developed in RAM 901c, and the address counter value is set as the lead address (step 1). Next, completion of a vertical synchro (in the paper feed direction) is waited (step 2). If a synchro is obtained, completion of a horizontal synchro (in the scan direction) is waited (step 3). It is taken checked if the contents of the address indicated by the address counter are "1" (black dot) or not (step 4). If "1", the video signal VD from CPU 901a is made off (step 5), and a black electrostatic latent image is formed on the photosensitive member 917. The control advances thereafter to step 7. If not "1", the video signal VD from CPU 901 is made on (step 6) to form a white electrostatic latent image on the photosensitive member 917.

Next, the address counter (not shown) is incremented (step 7). It is checked if one line scan has been completed (step 8). If not, the control returns to step 3. If yes, dot information on the next scan line is read from the memory card 400, developed in RAM 901c, and the value of the address counter is set as the lead address of the scan line (step 9). Next, it is checked if the vertical scan has been completed (step 10). If not, the control returns to step 2, whereas if yes, the processes are terminated.

In the above embodiment, image data stored in the memory card 400 are reproduced on the photosensitive member 917 by using the laser unit. Instead of the laser unit, a known LED array, liquid crystal shutter may be used.

In the above embodiment, the IC memory card is used as an external storage means. Other stage medium such as magnetic storage unit, laser card or the like may be used with the same advantageous effects described previously.

Further, in the above embodiment, the image data stored in the memory card 400 are developed for each scan line in RAM 901c. The image data may be developed in units of one format, or the image data are directly transferred to the laser driver 901g without using RAM 901c.

Furthermore, in the above embodiment, a desired image portion within the image read with the image scanner 100 is selected by an operator and written in a recording medium (memory card, EPROM or the like). The recording medium is then connected to the interface unit of the copying machine 500. The selected image information may be transmitted to the copying machine 500 from a serial interface unit through serial communication.

Figure 16:
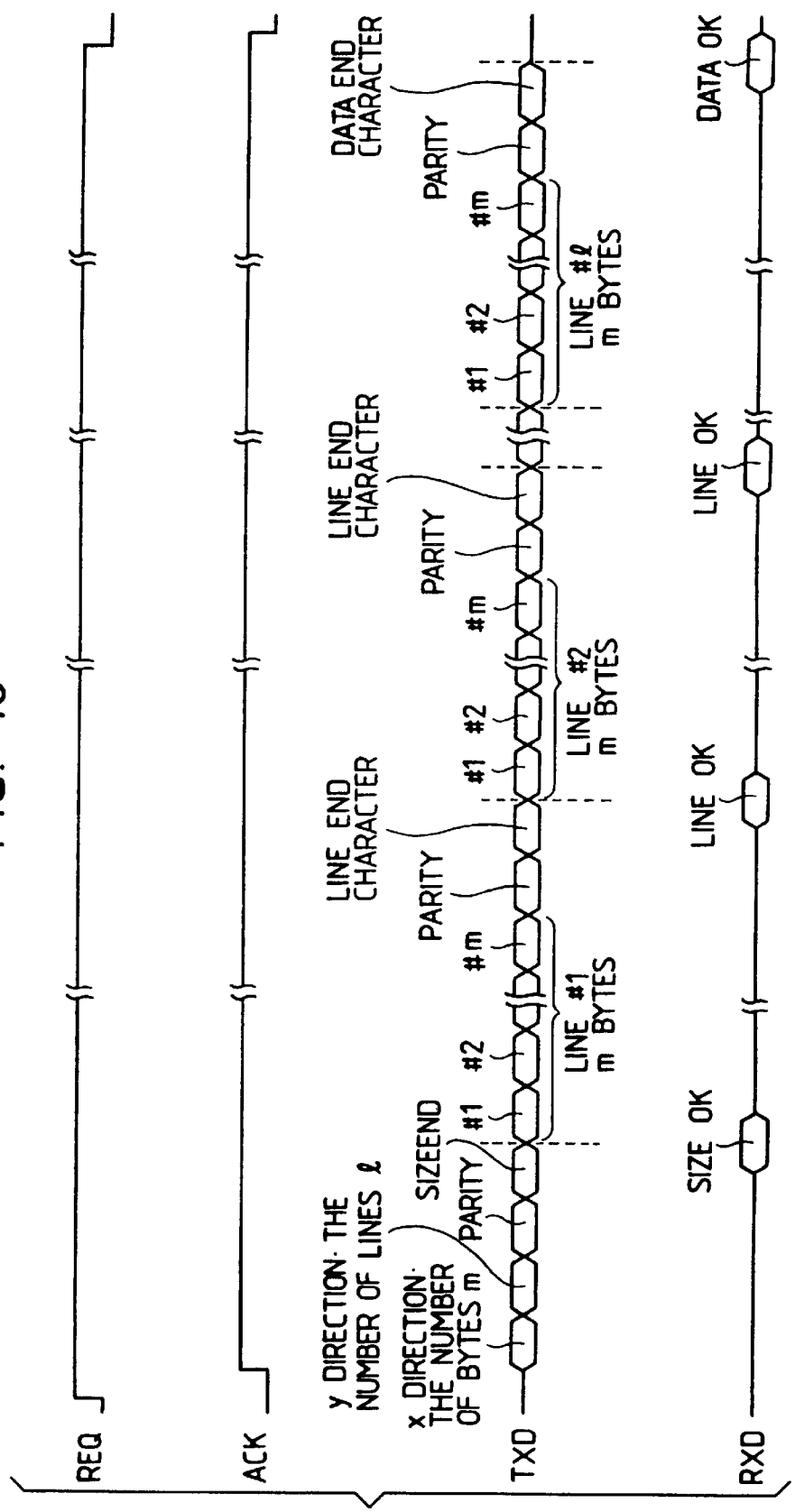
FIG. 16 is a timing chart for data transfer.

FIG. 16 is a timing chart of image data transfer through serial communication.

Upon depression of the transmission key 405 on the operation unit of the image processing apparatus, MPU 203 sends a request (REQ) signal to the external interface E of the copying machine 500 via the connection terminal 213 to which a predetermined signal line of the copying machine 500 is connected. If the copying machine 500 is in a reception enabled state, an acknowledge (ACK) signal is outputted immediately, and the data reception is waited.

MPU 203 first sends four bytes via the serial I/O 212 to the copying machine 500, the four bytes including the byte number m of an add-on image in the x-direction, the number 1 of lines in the y-direction, parity, and SIZE END character.

Upon detection, by the copying machine 500, of the SIZE END character, a parity of the first two bytes is obtained and compared with the received parity code. If the parities are coincident with each other, a SIZE OF character is transmitted.

Upon detection of the SIZE OK character, the next image data stored in the data RAMs 205 and 206 are transmitted. The next image data include m bytes of line No. 1 data, one byte of parity, and one byte of LINE END character, totaling to (m+2) bytes. Upon detection by the copying machine 500 of the LINE END character, a parity of the m bytes of the line No. 1 data is obtained and compared with the received parity code. If the parities are coincident with each other, a LINE OK character is transmitted.

Upon detection by MPU 203 of the LINE OK character, the next image data include m bytes of line No. 2 data, one byte of parity, and one byte of LINE END character, totaling to (m+2) bytes. The above operations are repeated (1—1) times. At the last 1 line operation, instead of the LINE END character, a DATA END character is transmitted.

Upon detection by the copying machine 500 of the DATA END character, a parity of the m bytes of the line No. 1 is obtained and compared with the received parity code. If the parities are coincident with each other, a DATA OK character is transmitted.

Upon detection by MPU 203 of the DATA OK character, the REQ signal is turned off. The copying machine confirms this turn-off of the REQ signal, and thereafter an ACK signal is turned off, to thus terminate data transfer through serial communication.

The image data transmitted to the copying machine 500 in the above manner are developed on RAM 901c shown in FIG. 13, and recorded on a recording sheet in the manner previously described.

As described above, the information of an image to be added to an original image can be prepared easily without a complicated work of changing a memory, forming fonts and the like operation.

Further, the formed image information is stored in an external storage medium such as an IC card different from the storage medium of the copying machine itself. Therefore, even if a plurality of copying machines are used, the same image information can be added to an original image simply by mounting the external storage medium.

Furthermore, formation of the image information to be added to an original can be performed independently from the operation of the copying machine. Therefore, the copying machine can be used while the add-on image information is formed.

In the above embodiment, an original image is copied by exposing the optical image thereof directly on the photosensitive member. However, the original image may be read with a CCD image sensor to form the image on the photosensitive member with a laser beam. Instead of a copying machine using a photosensitive member, a copying machine using an ink jet printer, thermal transfer printer or the like may also be used.

The present invention has been described in connection with the preferred embodiment. The invention, however, is not limited to the embodiment structure only, but it is apparent that various modifications and alterations are possible without departing from the scope of appended claims.

We claim:

1. An image processing apparatus, for storing image data in a storage medium that is detachably mountable on a copying machine, which includes a laser beam device, a photosensitive member, and a scanner, and which copies an original image scanned by the scanner, said image processing apparatus cooperating with the copying machine to add an image represented by the image data stored in the storage medium to the original image, said image processing apparatus comprising manually operable scanner means, provided separately from the copying machine, for generating image data;

memory means for storing the image data generated by said manually operable scanner means;

editing means, provided separately from the copying machine, for performing a desired editing process for the image data generated by said manually operable scanner means and stored in said memory means; and storage means for causing the image data edited by said editing means to be stored in the storage medium, wherein the image data stored in the storage medium is read by the copying machine, which uses the laser beam device to write the image data directly onto the photosensitive member such that the image data is combined with the original image during a copying operation.

2. An image processing apparatus according to claim 1, wherein said editing means is operable to extract desired image data from the image data generated by said manually operable scanner means.

3. An image processing apparatus according to claim 1, further comprising means for displaying the image data generated by said manually operable scanner means.

4. An image processing apparatus according to claim 1, further comprising means for transmitting the image data edited by said editing means to the copying machine.

5. An image processing apparatus according to claim 1, wherein the storage medium is in a card configuration.

6. An image processing apparatus for storing image data in a storage medium that is detachably mountable on a copying machine that includes a laser beam device, a photosensitive member, and a scanning device, the copying machine copying an original image scanned by the scanning device and adding the original image to an image represented by the image data stored in the storage medium, said image processing apparatus comprising:

manually operable scanner means for entering image data representing the image to be added to the separately provided original image, said manually operable scanner means being provided separately from the copying machine;

memory means for storing the image data entered by said manually operable scanner means;

display means for displaying the image to be added to the separately provided original image in accordance with the image data stored in said memory means; editing means, provided separately from the copying machine, for performing a desired editing process on the image data entered by said manually operable scanner means; and storage means for causing the image data stored in said memory means to be stored in the storage medium, wherein the image data stored in the storage medium is read by the copying machine, which uses the laser beam device to write the image data directly onto the photosensitive member such that the image data is combined with the separately provided original image during a copying operation.

7. An image processing apparatus according to claim 6, further comprising means for performing a desired editing process for the image data stored in said memory means.

8. An image processing apparatus according to claim 7, wherein said editing means is operable to extract desired image data from the image data stored in said memory means.

9. An image processing apparatus according to claim 7, further comprising means for instructing a desired editing process.

10. An image processing apparatus according to claim 6, wherein the storage medium is in a card configuration.

11. An image processing method usable with a manually operable scanner means, and a copying machine having a laser beam device and a photosensitive member, said method comprising the steps of:

reading an image to be added to an original image using the manually operable scanner means, which is provided separately from the copying machine, and which generates image data;

storing image data generated by the manually operable scanner means in a memory;

performing a desired editing process on the image data generated by the manually operable scanner means with an editor that is provided separately from the copying machine;

storing the edited image data in a storage medium that is detachably mountable on the copying machine;

reading out the edited image data from the storage medium;

scanning the original image using a scanner that is provided separately from said manually operable scanner means;

adding the edited image data to the original image by using the laser beam device to write the edited image data directly onto the photosensitive member during a copying operation to produce a combined image; and printing the combined image produced in said adding step.

12. An image copying system usable with a copying machine having a laser beam device and a photosensitive member for copying an original image to which another image is added, said image copying system comprising:

manually operable scanner means, provided separately from the copying machine, for reading image data to be added to an original image;

memory means for storing the image data read by said manually operable scanner means;

means, provided separately from the copying machine, for performing a desired editing process for the image data read by said manually operable scanner means;

means for causing the edited image data to be stored in a storage medium, which is detachably mountable on the copying machine;

means for reading out the edited image data from said storage medium;

scanner means, provided separately from said manually operable scanner means, for scanning the original image; and means for adding the edited image data to the original image by using the laser beam device to write the edited image data directly onto the photosensitive member during a copying operation.

* * * * *

UNITED STATES PATENT AND TRADEMARK OFFICE
CERTIFICATE OF CORRECTION

PATENT NO. : 5,822,082

DATED : October 13, 1998

INVENTOR(S) : SHUNJI SATO, ET AL.

It is certified that error appears in the above-identified patent and that said Letters Patent is hereby corrected as shown below:

Title page,

<u>Inventors</u>: [75]

"Koji Doji" should read --Koji Doi,--.

<u>COLUMN 1</u>

Line 21, "has" should read --has a--.

Line 22, "a" should be deleted.

<u>COLUMN 4</u>

Figure 6A:
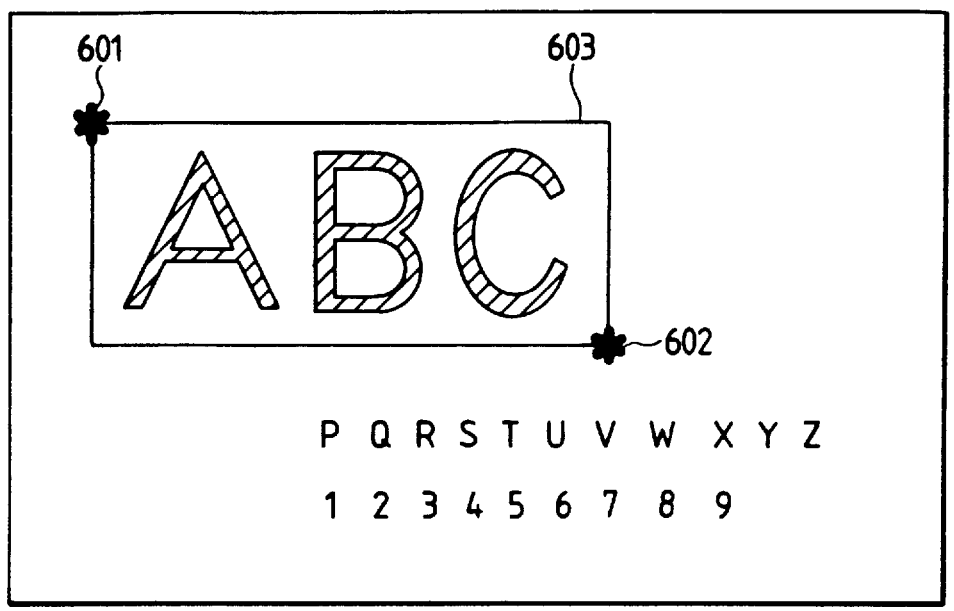
FIG. 6 consist of FIGS. 6(A) and 6(B), shows examples of displays on an LCD panel.
Figure 6B:
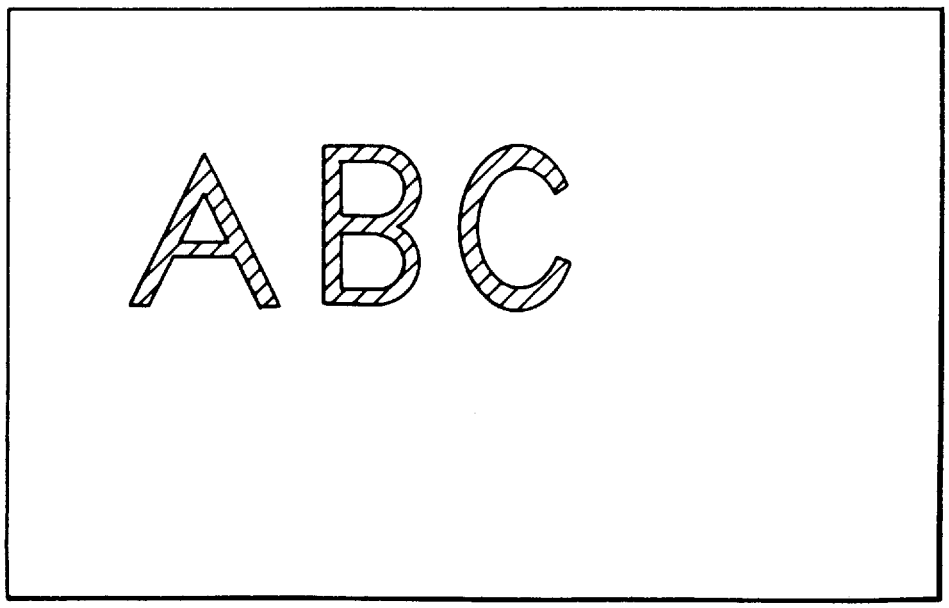

Line 20, "FIG. 6(1)" should read --FIG. 6A--.

<u>COLUMN 5</u>

Line 9, "1 lines," should read --one line,--.

UNITED STATES PATENT AND TRADEMARK OFFICE
CERTIFICATE OF CORRECTION

PATENT NO. : 5,822,082

DATED : October 13, 1998

INVENTOR(S) : SHUNJI SATO, ET AL.

It is certified that error appears in the above-identified patent and that said Letters Patent is hereby corrected as shown below:

<u>COLUMN 8</u>

Line 35, "FIGS. 11a and 11b," should read --FIGS. 11A and 11B--.

Line 37, "FIGS. 11a and 11b", should read --FIGS. 11A and 11B,--.

<u>COLUMN 13</u>

Line 26, "comprising" should read --comprising:--.

Signed and Sealed this

Fourteenth Day of November, 2000

Attest:

*Attesting Officer*

Q. TODD DICKINSON

*Director of Patents and Trademarks*